M. K. PATTEN.
FISHING ROD.
APPLICATION FILED APR. 19, 1918.
1,271,073.
Patented July 2, 1918.
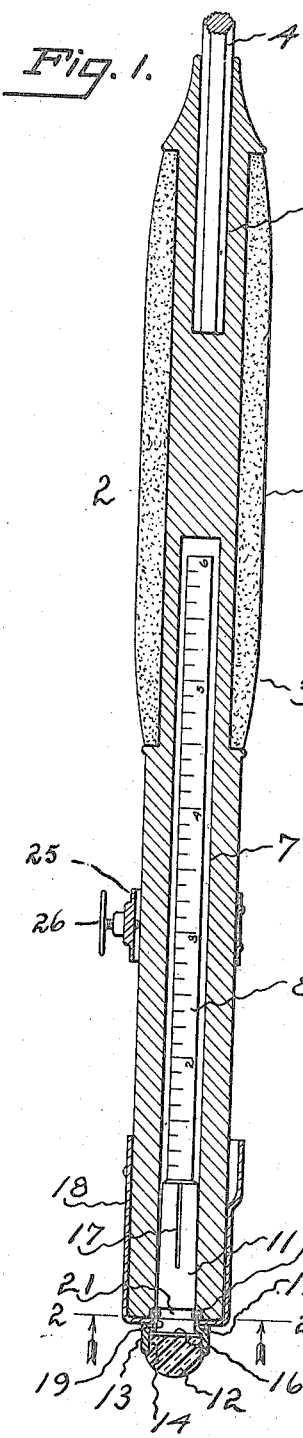
Fig. 1.
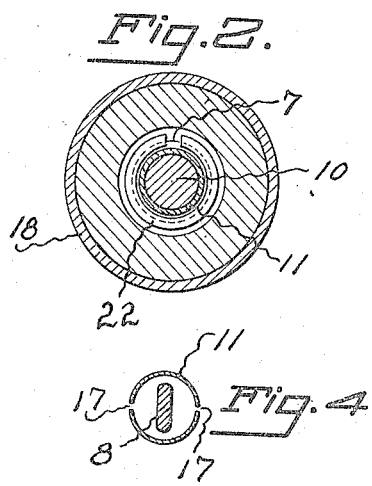
Fig. 2.
Fig. 4.
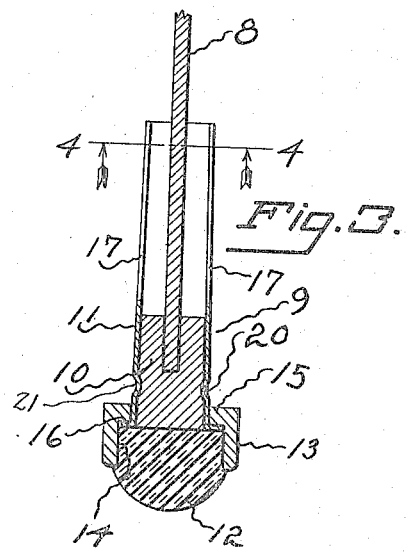
Fig. 3.
M. K. Patten, Inventor
By Huth Sutherland, Attorney

UNITED STATES PATENT OFFICE.

MILTON KURAN PATTEN, OF TORRINGTON, CONNECTICUT.

FISHING-ROD.

1,271,073.  Specification of Letters Patent.  Patented July 2, 1918.

Application filed April 19, 1918. Serial No. 229,481.

*To all whom it may concern:*

Be it known that I, MILTON K. PATTEN, a citizen of the United States, residing at Torrington, in the county of Litchfield and State of Connecticut, have invented certain new and useful Improvements in Fishing-Rods, of which the following is a specification.

This invention relates to fishing-rods. It is a matter of fact that in various sections of this country the laws regarding the taking of fish under a certain size are stringent and severe. As a rule a fisherman will guess at the size of the fish he has caught. Frequently he will make an error, and in this event is apt to be caught by a game warden and subjected to trial and if found guilty, is heavily penalized. Things of this character do happen frequently through the innocence or lack of knowledge of the sportsman. I provide a way by which this difficulty can be eliminated, in that I furnish a means for measuring a fish about the length of which the fisherman may have some doubt, and if it be under size, he can throw it back into the water. I provide a rule or measuring device in correlation with the rod, it actually being when not in use, incased within the rod so as to be normally out of the way, yet readily accessible for action, the handle of the rod providing an effective means for receiving the rule or measuring device. I also provide means of a positive and certain nature for holding the rule in position, by reason of which it cannot become accidentally dislodged while the user of the rod is using it in fishing.

In the drawings accompanying and forming part of the present specification I have shown in detail one form of embodiment of the invention which I will set forth fully in the following description. I do not limit myself to this particular disclosure; I may depart therefrom in several respects within the scope of the invention defined by the claims following said description.

Referring to said drawings:

Figure 1 is a vertical section of part of a rod involving the invention.

Fig. 2 is a cross section on the line 2—2 of Fig. 1.

Fig. 3 is a sectional detail of a part of the rule and its carrier, and

Fig. 4 is a transverse section on the line 4—4 of Fig. 3.

Like characters refer to like parts throughout the several views, which it will be noticed are on different scales.

In Fig. 1 I have shown the butt portion of a rod which I will denote in a general way by 2. This rod comprises a handle portion 3 and a rod portion 4, the handle portion being covered with a grip 5 which is customarily made of cork. The rod portion 4 is usually tightly fitted in a socket 6 which extends downward into the handle portion 3 from its upper or forward end. This handle portion also has a longitudinally disposed bore 7 which extends from the rear end to at least considerably more than half the length thereof, the forward end of the bore as shown being closed.

As will be inferred the device comprises a rule or linear measuring device, and this may vary decidedly as to character. It may consist of a single strip, or it may be flexible or comparatively rigid or foldable, the invention obviously not concerning such a detail. In addition to a rule or measuring device such as that denoted in a general way by 8, there is provided therefor a carrier. This carrier may like the rule vary decidedly as to character; conveniently and desirably it presents a plug for the rear open end of the handle portion 3, being adapted as I will hereinafter explain to enter the bore 7. The rule carrier 9 includes in its make-up a body portion 10 into which practically centrally thereof the butt or shank portion of the rule 8 is closely fitted. Around the body portion 10 is disposed a sleeve 11, the sleeve as shown being externally tapered for a reason that will hereinafter appear. I might note at this point that externally the reduction in size of the sleeve 11 is from the back toward the front. The rear ends of the sleeve and body portion are practically coincident, and they rest upon a button as 12. The body portion 10 may be of any suitable material such for instance as wood, while the sleeve 11 will be of sheet metal, the button 12 ordinarily consisting of vulcanized rubber, although the matter of materials of which these or any other parts are composed, is not necessarily vital. Fitted around the button 12 is a band 13 which is set partly in an annular groove 14 upon the forward external part of the button. This band, as will be understood, tightly fits the button, and it has an inturned circular flange 15 which engages against an outturned circular flange 16 of the sleeve 11, thus providing a simple way of holding certain of the parts in assembled relation.

The tapered sleeve 11 is slitted to secure a certain amount of resiliency, there being as shown two longitudinally extending slits 17 open at their forward ends and their rear ends being in proximity to the body 10. The rear or butt end of the handle portion 3 receives the ferrule 18 generally made of sheet metal and which is held to the said handle portion in any desirable way. This ferrule overlies the back of the handle portion and its opening 19 exactly registers with the bore 7, in view of which circumstance the sleeve 11 with the rule 8 can be freely entered in the bore and pushed home until the flange 15 abuts against the back part of the ferrule as shown in Fig. 1.

I have virtually noted the fact that preferably I do not rely upon the fit of the carrier 9 with its rule 8, in or to the handle portion 3 to prevent accidental separation of said parts. I provide positive means to insure this particular condition, and those shown for the purpose will now be described. The sleeve 11 is shown as having the inwardly extending bead 20 which fits an annular groove in the body portion 10, the bead 20, as will be clear being of circular formation or continuous. The production of this bead for instance by spinning or otherwise forms upon the sleeve 11 the annular groove 21, which it will be noted, is in proximity to the flange 15, although this may not always be necessary. Mounted in the bore 7 near the back or rear end thereof, is a split spring ring 22, constituting a suitable latch or detent, and this split spring ring is adapted to automatically enter the annular groove 21 when the same is brought opposite the ring by the insertion of the carrier 9 and rule 8 into the bore 7. This split ring may be held in place in any desirable manner, and is in proximity to the flanged rear end of the ferrule 18. While it accomplishes in a satisfactory manner the purpose for which it is intended, it does not prevent when necessary the ready pull of the carrier 9 and rule 8 from place for use of the rule. This withdrawal of the carrier and rule may be accomplished by gripping the band 13 which I might observe is also manipulated in mounting the parts in place.

The rear part of the butt portion 2 slidingly carries a cuff 25 adjustable thereon and provided with the screw 26 to engage the handle and thus hold the cuff in an adjusted position.

What I claim is:

1. A fishing rod handle having a bore, a plug insertible in the bore and provided with a rule connected therewith for insertion also into the bore, the plug having an annular groove, and the handle having an annular spring therein which fits the groove to positively prevent accidental removal of the plug, the plug when the spring is seated in the groove therein abutting against the rear end of the handle.

2. A fishing-rod handle having a bore, a body portion, a sleeve surrounding the body portion and provided with an external annular groove, thereby forming a corresponding bead within the sleeve, the body portion having in turn a groove to receive the bead, a rule extending into the sleeve and into the body portion, the rule extending from the sleeve, a button fitted against the end of the sleeve and the body portion, a band around the sleeve, the band having an inturned flange and the sleeve having an outturned flange against which the other flange fits, said sleeve being removably fitted into said bore, and the handle having a latch to fit the external groove of the sleeve.

3. A fishing-rod handle having a bore, a body portion, a sleeve surrounding the body portion and provided with an external annular groove, thereby forming a corresponding bead within the sleeve, the body portion having in turn a groove to receive the bead, a rule extending into the sleeve and fitted in the body portion, the rule projecting from the sleeve, a button fitted against the end of the sleeve and the body portion, a band around the sleeve, the band having an inturned flange and the sleeve having an outturned flange against which the other flange fits, said sleeve being removably disposed in said bore, and said inturned flange against the end of the handle, the sleeve being longitudinally tapered, spaced from the rule and having longitudinally extending slits.

In testimony whereof I affix my signature in the presence of two witnesses.

MILTON KURAN PATTEN.

Witnesses:
EUGENE T. O'SULLIVAN,
ARTHUR R. PATTEN.